I. ISAACHSEN.
NUTCRACKER
APPLICATION FILED SEPT. 28, 1920.
1,420,263.
Patented June 20, 1922.
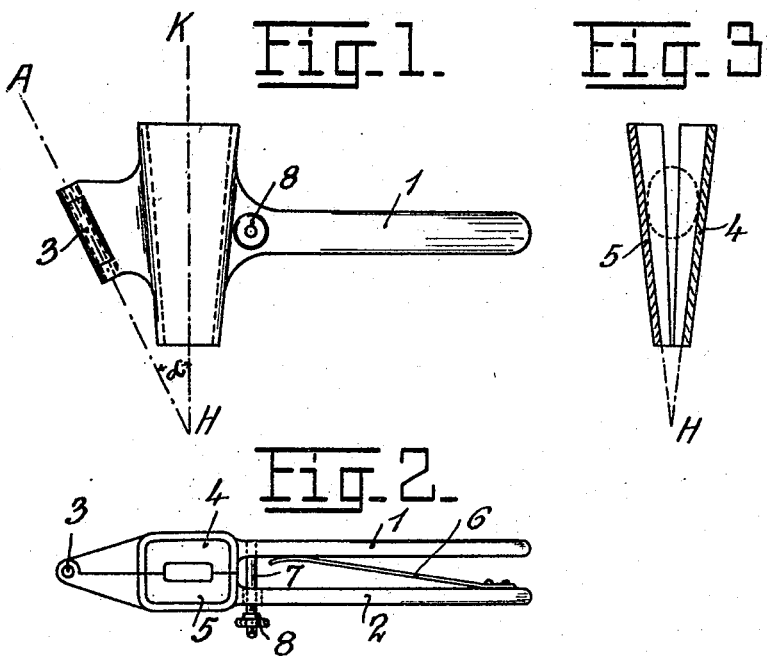
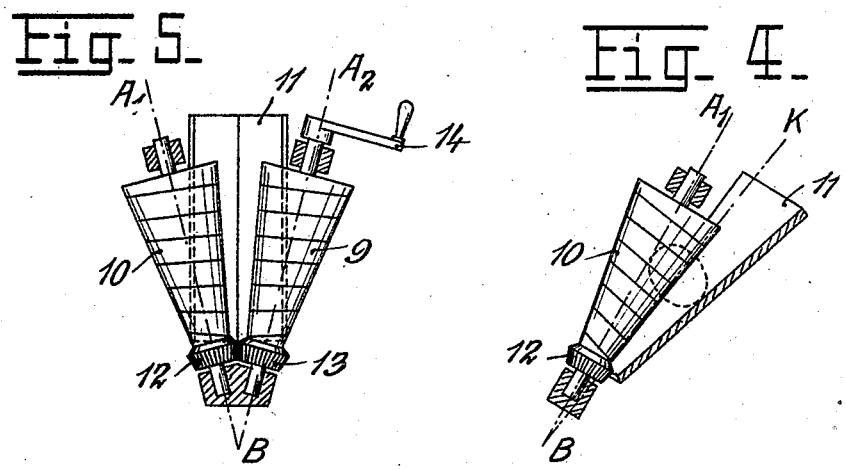
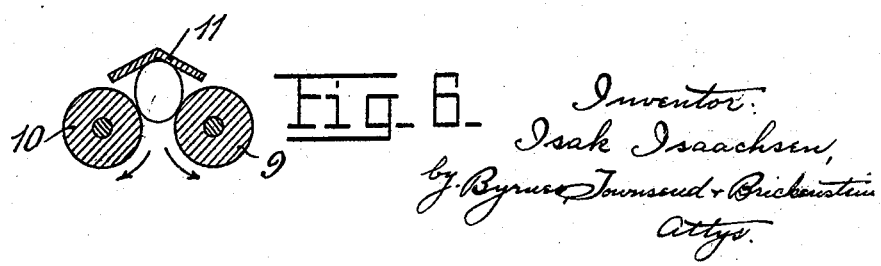
Inventor:
Isak Isaachsen,
by Byrne, Townsend & Brickenstein
Attys.

UNITED STATES PATENT OFFICE.

ISAK ISAACHSEN, OF CHRISTIANIA, NORWAY, ASSIGNOR TO A/S DE NORSKE SALTVERKER, OF CHRISTIANIA, NORWAY.

NUTCRACKER.

1,420,263.   Specification of Letters Patent.   Patented June 20, 1922.

Application filed September 28, 1920. Serial No. 413,382.

*To all whom it may concern:*

Be it known that I, ISAK ISAACHSEN, a subject of the King of Norway, residing at Christiania, Norway, have invented certain new and useful Improvements in a Nutcracker; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The usual nut crackers comprise two levers pivotally connected to each other at one end and adapted to receive the nuts to be cracked at some place between their connecting point and their free ends in accordance with the size of the nut to be cracked. The jaws of said nut crackers form between them a cracking space having a more or less wedge-shaped cross section, and the jaws swing in a plane parallel with the axis of the wedge.

According to the present invention the jaws are also forming between them a conical or wedge-shaped crushing-space, but the swinging movement of the jaws takes place in a plane which forms an angle with the axis of the wedge, i. e. the levers forming the jaws are provided between their pivoted point and their free ends with channels forming an angle with the said levers and forming between them a tapering chamber into which the nuts are dropped for crushing.

On the drawing:

Fig. 1 is a side view of a hand nut cracker according to the invention.

Fig. 2 is a top view of the same.

Fig. 3 is a section on the line K—H of Fig. 1.

Figs. 4 and 5 show two section views taken at right angles to each other of a nut cracking machine in accordance with the invention and provided with rotary cracking jaws.

Fig. 6 is a cross section through the machine shown on Figs. 4 and 5.

The nut cracker according to Figs. 1—3 comprises two levers 1, 2 pivotally connected at one end by means of trunnion 3.

The axis A—H of said trunnion 3 preferably forms an angle with the levers 1, 2.

Between two ends the levers are provided with tapering channels 4, 5 which fit together to form a tapering crushing chamber the axis K—H of which forms an angle $\alpha$ with each other. A plate spring 6 tends to open the cracker, the opening movement of the same being limited by means of screw 7 with nut 8.

When a nut is to be cracked the cracker is opened as far as possible, and the nut is let down in the tapering crushing chamber where it comes to rest at a point determined by the size of the nut.

In order to obtain that the ratio of the crushing movement and the size of the nut shall be constant it is necessary that the tapering sides 4, 5 of the crushing chamber if extended shall cross in the crossing point H of the axes A—H, K—H.

According to the form of the invention shown on Figs. 5—6 rotating rollers 9, 10 with helical grooves or ribs are substituted for the levers 1, 2, said rollers rotating about axes $a'$ $b$, $a^2$ $b$ forming an angle with each other. Said two rollers form one wall of a tapering cracking chamber, the other wall is formed by means of stationary plate or angle iron 11 between axes $a'$ $b$, $a^2$ $b$ forming with the central line K—H the tapering chamber an acute angle $\alpha$. The two rollers may be interconnected by means of bevel gears 12, 13 and one of the rollers may be provided with a handle 14.

Claims:

1. In a nut cracker two cracking levers pivotally connected at their ends by means of a trunnion the axis of which forms an acute angle with the said levers, said levers being provided with channels substantially at right angles to the same and forming between them a tapering crushing chamber.

2. In a nut cracker two cracking levers, a trunnion for pivotally connecting said levers and tapering channels across said levers, said tapering channels forming between them a tapering crushing chamber, the axis of which forms an acute angle with the axis of the said trunnion, the tapering sides of said crushing chamber forming between them an angle the top-point of which lies near the crossing-point between the trunnion axis and the axis of the tapering crushing chamber.

3. A nut cracker comprising two levers pivotally connected at their ends by means of a trunnion, means on the two levers defining a downwardly tapering crushing chamber substantially at right angle to the levers, the axis of the trunnion forming with the axis of the chamber an angle having its apex below the crushing chamber.

4. A nut cracker comprising two levers pivotally connected at their ends by means of a trunnion, means on the two levers defining a downwardly tapering crushing chamber substantially at right angle to the levers and extending partly above and partly below the plane thereof, the axis of the trunnion forming with the axis of the chamber an angle having its apex below the crushing chamber.

5. In a nut cracker, a plurality of relatively movable sections having crushing surfaces inclined toward each other to form a crushing space tapering downwardly toward a common point as apex, at least one of the sections having movement about an axis substantially intersecting the virtual apex of the crushing space and inclined relatively to all lines passing through the crushing space and the virtual apex thereof.

In testimony that I claim the foregoing as my invention, I have signed my name in presence of two subscribing witnesses.

ISAK ISAACHSEN.

Witnesses:
   A. B. COOK,
   EDITH SKAUGEN.

Certificate of Correction.

It is hereby certified that Letters Patent No. 1,420,263, granted June 20, 1922, upon the application of Isak Isaachsen, of Christiania, Norway, for an improvement in " Nutcrackers," were erroneously issued to " A/S De norske Saltverker," as assignee of the entire interest in said invention, whereas said Letters Patent should have been issued to *the inventor, said Isaachsen*, as sole owner of said invention; and that the said Letters Patent should be read with this correction therein that the same may conform to the record of the case in the Patent Office.

Signed and sealed this 29th day of August, A. D., 1922.

[SEAL.]                             KARL FENNING,

*Acting Commissioner of Patents.*